(12) United States Patent
Bolt et al.

(10) Patent No.: US 7,813,281 B2
(45) Date of Patent: Oct. 12, 2010

(54) INTERACTIVE MPLS TRAFFIC ENGINEERING

(75) Inventors: Gordon Bolt, Apex, NC (US); Michael Ernst, VisionCrest (SG); Edward A. Sykes, Cary, NC (US)

(73) Assignee: OPNET Technologies, Inc., Bethesda, MD (US)

( * ) Notice: Subject to any disclaimer, the term of this patent is extended or adjusted under 35 U.S.C. 154(b) by 342 days.

(21) Appl. No.: 12/098,436

(22) Filed: Apr. 6, 2008

(65) Prior Publication Data

US 2009/0285093 A1    Nov. 19, 2009

Related U.S. Application Data

(60) Provisional application No. 60/912,713, filed on Apr. 19, 2007.

(51) Int. Cl.
*H04L 12/24* (2006.01)
*H04J 3/14* (2006.01)

(52) U.S. Cl. .................. 370/231; 370/230; 370/238; 398/57

(58) Field of Classification Search ......... 370/230–238, 370/395.2, 395.21, 395.31, 465–468, 509–514; 398/47, 57
See application file for complete search history.

(56) References Cited

U.S. PATENT DOCUMENTS

| 5,742,587 | A | * | 4/1998 | Zornig et al. | ............... | 370/235 |
| 6,259,679 | B1 | | 7/2001 | Henderson et al. | | |
| 2005/0105905 | A1 | * | 5/2005 | Ovadia et al. | ............... | 398/47 |

FOREIGN PATENT DOCUMENTS

| WO | WO 96/41451 | 12/1996 |
| WO | WO 02/101714 A1 | 12/2002 |
| WO | WO 2004/056047 A1 | 7/2004 |

* cited by examiner

*Primary Examiner*—Afsar M. Qureshi
(74) *Attorney, Agent, or Firm*—Robert M. McDermott, Esq.

(57) ABSTRACT

An interactive system and method automates the control and management of routing changes that are focused on specific routes or particular network hot spots. Based on the premise that the user is aware of a particular problem that needs to be solved, the system leads the user through an end-to-end process from the identification of the problem to the generation of configuration instructions for effecting a selected solution. A graphic user interface provides a visualization of the current routing and alternative routings, to facilitate the analysis and selection of an improved routing, if any. Throughout the process, the effect of each proposed routing change on the overall network performance is determined, so that the selection of a preferred solution can be made in the appropriate context, and globally sub-optimal solutions can be avoided.

39 Claims, 3 Drawing Sheets

| Source | Destination | P/S | L1 | L2 | L3 | L4 |
|---|---|---|---|---|---|---|
| Seattle | New York | P | SEA-CHI | CHI-NYC | | |
| | | S | SEA-SLC | SLC-KC | KC-DC | DC-NYC |
| Seattle | Atlanta | P | SEA-SF | SF-ATL | | |
| | | S | SEA-SLC | SLC-CHI | CHI-DC | DC-ATL |
| Houston | Chicago | P | HOU-CHI | | | |
| | | S | HOU-ATL | ATL-CHI | | |
| ⋮ | | | | | | |
| San Francisco | New York | P | SF-ATL | ATL-NYC | | |
| | | S | SF-SLC | SLC-CHI | CHI-NYC | |

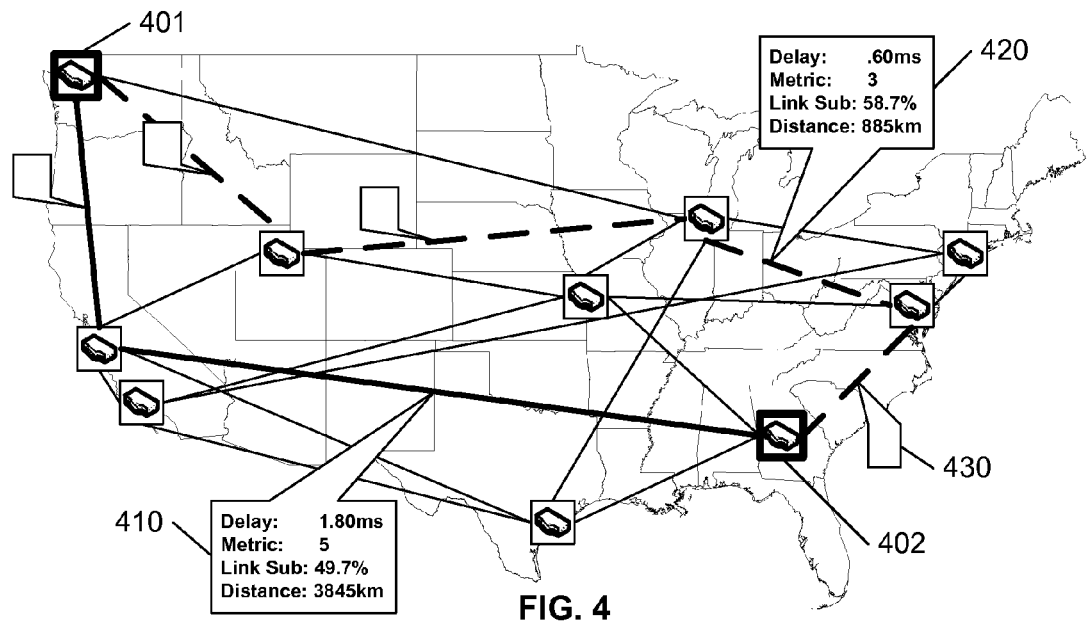
FIG. 4
| Route Name | Metric | Max. Link Sub | Delay (ms) | Hops | Distance (km) |
|---|---|---|---|---|---|
| Candidate | 10 | 39.2 | 8.1 | 3 | 4240 |
| Explicit SE-SF-AT | 9 | 49.7 | 8.2 | 2 | 4752 |
| Candidate | 12 | 38.2 | 8.5 | 3 | 4680 |
| Candidate | 15 | 48.6 | 9.6 | 4 | 4825 |
| Explicit SE-SL-CH-DC-A | 14 | 58.7 | 9.8 | 4 | 5490 |
FIG. 5
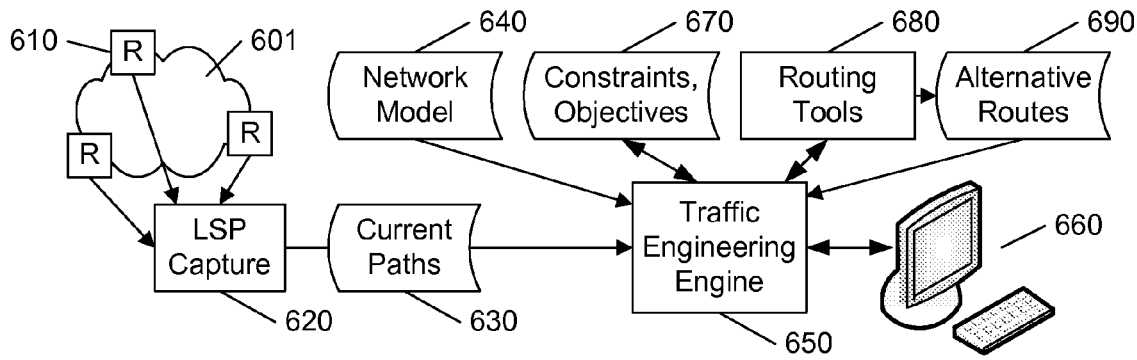
FIG. 6

INTERACTIVE MPLS TRAFFIC ENGINEERING

This application claims the benefit of U.S. Provisional Patent Application 60/912,713, filed 19 Apr. 2007.

BACKGROUND AND SUMMARY OF THE INVENTION

This invention relates to the field of traffic engineering, and in particular to the interactive maintenance and enhancement of routes for virtual circuits, such as Label-Switched Paths (LSPs), subject to routing and other network traffic constraints.

Traffic engineering generally includes the tasks of predicting the behavior of communications networks, and modifying the behavior as required to provide an efficient and effective use of resources throughout the network. Traffic Engineering includes the process of creating 'virtual circuits' between source and destination nodes in order to make efficient use of network resources, to satisfy routing constraints for the circuits, and to improve network survivability. In the field of Multi-Protocol Label Switching, for example, traffic engineering includes determining primary and secondary routes for Label Switched Paths (LSPs).

A variety of tools and techniques have been developed to identify optimal, or near-optimal, configurations of modeled networks. In the field of label switching network configurations, tools are available to align the requirements placed on defined communication paths (LSPs) between nodes of the network with the resources available in an existing or proposed network, and thereby identify near-optimal routes for these virtual circuits.

As networks become more and more complex, with dynamic changes occurring regularly, the actual optimization of a network's performance becomes a daunting and sometimes infeasible or impractical task. When a change or addition to a network is implemented, the truly-optimal use of this changed or added resource may require a change to dozens, or hundreds, of other network resources. In like manner, when a change or addition to the communication requirements or constraints is made, the truly-optimal solution may also require many changes to the network. Often, due to the risks of introducing unanticipated problems with each change, and the well recognized maxim of "if it isn't broken, don't 'fix' it", few, if any, of the ancillary changes are actually implemented. Because of these factors, and others, most real-world networks gradually become substantially different from their ideally optimized configuration.

Conventional optimization tools and techniques receive a model of the network, including the capabilities of each link, and a list of required circuits between nodes and their associated constraints. The conventional tools then apply one or more allocation schemes to determine a preferred route for each circuit so as to satisfy each of the constraints subject to the network capabilities. Unfortunately, the resultant preferred or optimal solution often has little correspondence to the current configuration of the network, and the number of changes required to implement the proposed solution makes such an implementation infeasible or impractical.

Copending U.S. patent application Ser. No. 11/778,053, "CONTROLLED INCREMENTAL MULTI-PROTOCOL LABEL SWITCHING (MPLS) TRAFFIC ENGINEERING", filed 15 Jul. 2007 for Gordon Bolt, Edward A. Sykes, and Yu Liu, incorporated by reference herein, addresses this problem by limiting the scope of the optimization process. The system assesses an existing network configuration and identifies the potential changes to the existing configuration that provide the greatest incremental improvements to the performance of the network. Typically, the user of the system identifies the maximum number (N) of changes that may be implemented in an existing network, and the system provides a set of possible reconfigurations, each requiring fewer than N changes.

In each of these processes, the user has little to no control of the selection of routes to be assessed and/or modified, other than to 'lock' routes that must not be changed, or otherwise constrain the optimization process in the hope of forcing it to address particular routes of interest. Conceptually, these processes are well suited for 'strategic' or 'global' traffic engineering, but are poorly suited for 'tactical' or 'operational' traffic engineering.

Often, a network manager is aware of routes that are experiencing poorer than expected performance, or routes of particular importance that warrant frequent tune-ups to assure optimal performance. If the network manager is unable or unwilling to allow the conventional traffic engineering optimization processes to find a solution that may call for the re-routing of routes that are not currently experiencing problems, improving a particular route's performance becomes an ad-hoc process. Because of the multiple dependencies among routes of a network, however, the ad-hoc improvement of one route may introduce problems and/or cause degraded performance on other routes, often with significant unforeseen consequences. In many cases, the degraded performance occurs over the course of multiple ad-hoc changes, and the identification of the particular change(s) that needs to be undone to restore the network to its past performance capabilities is, at best, challenging.

It would be advantageous to provide an interactive system that allows a network manager or traffic engineer to address one or more specified routes for customized traffic engineering optimization, based on potential changes to the specified routes. It would be advantageous to allow the user to define the constraints that are to be used by the system in identifying the potential changes to the specified routes. It would be also be advantageous to record any changes selected by the user for implementation, and to generate the data necessary to reconfigure the network to effect the selected change(s).

These advantages, and others, can be realized by an interactive system and method that automates the control and management of routing changes that are focused on specific routes or particular network hot spots. Based on the premise that the user is aware of a particular problem that needs to be solved, the system leads the user through an end-to-end process from the identification of the problem to the generation of configuration instructions for effecting a selected solution. A graphic user interface provides a visualization of the current routing and alternative routings, to facilitate the analysis and selection of an improved routing, if any. Throughout the process, the effect of each proposed routing change on the overall network performance is monitored, so that the selection of a preferred solution can be made in the appropriate context, and globally sub-optimal solutions can be avoided.

BRIEF DESCRIPTION OF THE DRAWINGS

The invention is explained in further detail, and by way of example, with reference to the accompanying drawings wherein:

FIG. 4 illustrates an example display of a targeted route in an interactive traffic engineering system in accordance with this invention.

FIG. 5 illustrates an example display of candidate routes in an interactive traffic engineering system in accordance with this invention.

FIG. 6 illustrates an example block diagram of an interactive engineering system in accordance with this invention.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figures 1A, 1B:
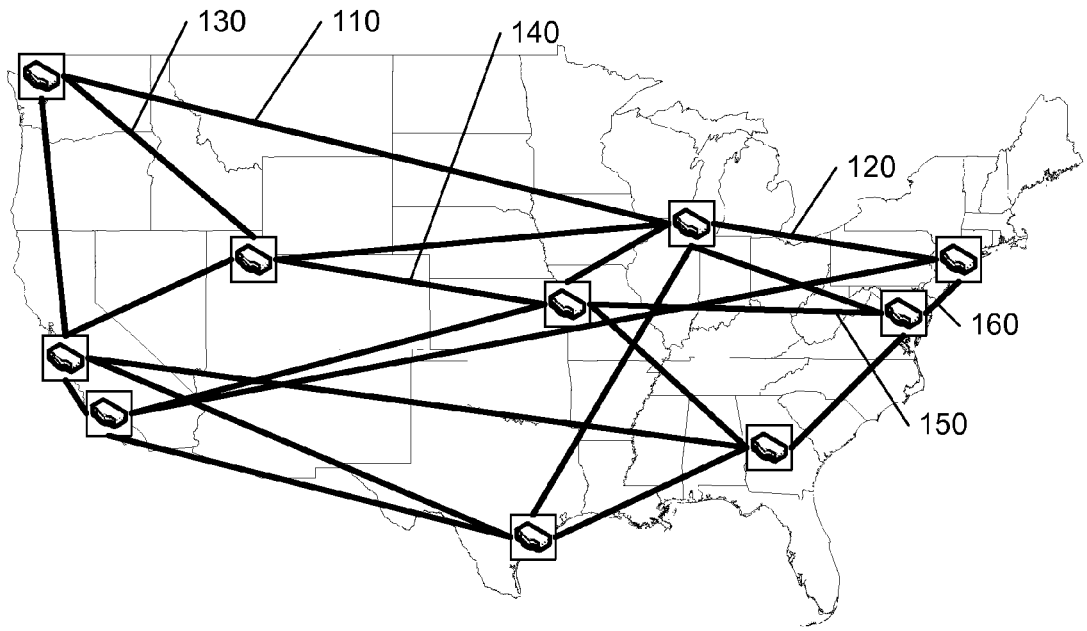
FIGS. 1A and 1B illustrate an example network diagram and corresponding example sets of primary and secondary Label-Switched Paths (LSPs) between given source and destination nodes.

FIG. 1A illustrates an example network diagram that shows links 110, 120, etc. between nodes that are located at various geographic locations across the United States. Each of the links will have a given set of characteristics and capabilities, such as distance, delay, total bandwidth, bandwidth available for traffic engineering in aggregate and optionally specified per bandwidth pool or class type, and so on.

FIG. 1B illustrates a corresponding example collection of primary and secondary explicit routes for virtual circuits from identified source and destination nodes. For example, under normal network operation virtual circuits originating at Seattle for communicating messages that are destined for New York are established using the primary route via the link 110 from Seattle to Chicago, then via the link 120 from Chicago to New York. If problems are experienced with that primary route, the virtual circuit is reestablished on the secondary route via the links from Seattle to Salt Lake City 130, Salt Lake City to Kansas City 140, Kansas City to Washington D.C. 150, and DC to New York 160. These routes are determined based on a set of requirements for each circuit, such as a minimum bandwidth in a given bandwidth class type or pool.

As each circuit subscribes to (is allocated to) a given set of links, the resources remaining available on each link for other circuits is correspondingly reduced. Unless care is taken in the allocation of links to each circuit, some links may become 'over-subscribed' and unable to satisfy the requirements of additional circuits that need to use these links. Ideally, the maximum subscription to any link on the network should be less than 100% of the link's capabilities and load should be balanced (if possible) throughout the network to avoid both highly congested links and very lightly loaded links. As noted above, algorithms and tools have been developed to facilitate traffic engineering by deriving sets of primary routes that minimize the maximum subscription to any link on the network, subject to a given set of constraints. These constraints typically address a maximum path delay, a maximum number of hops (links in route), and so on. These same algorithms are also used to derive sets of secondary routes, subject to additional diversity constraints that limit a circuit's secondary route's use of the links of the circuit's primary route. The secondary routes may also have relaxed constraints regarding path delay and the number of hops.

Conventional traffic engineering tools are generally designed to optimize overall network performance without regard to improving or modifying any particular path. In accordance with this invention, a user is provided the option of selecting a target path to modify/improve. Constraints are specified for the particular path, and the system identifies candidate routes that satisfy these constraints. The expected performance parameters of each route are displayed, and the user selects a preferred route based on these parameters. The resultant changes in performance, for both the selected route and the overall network, are displayed, and when the user confirms the selection, the command files required to effect the reconfiguration are generated for automating this reconfiguration.

Figure 2:
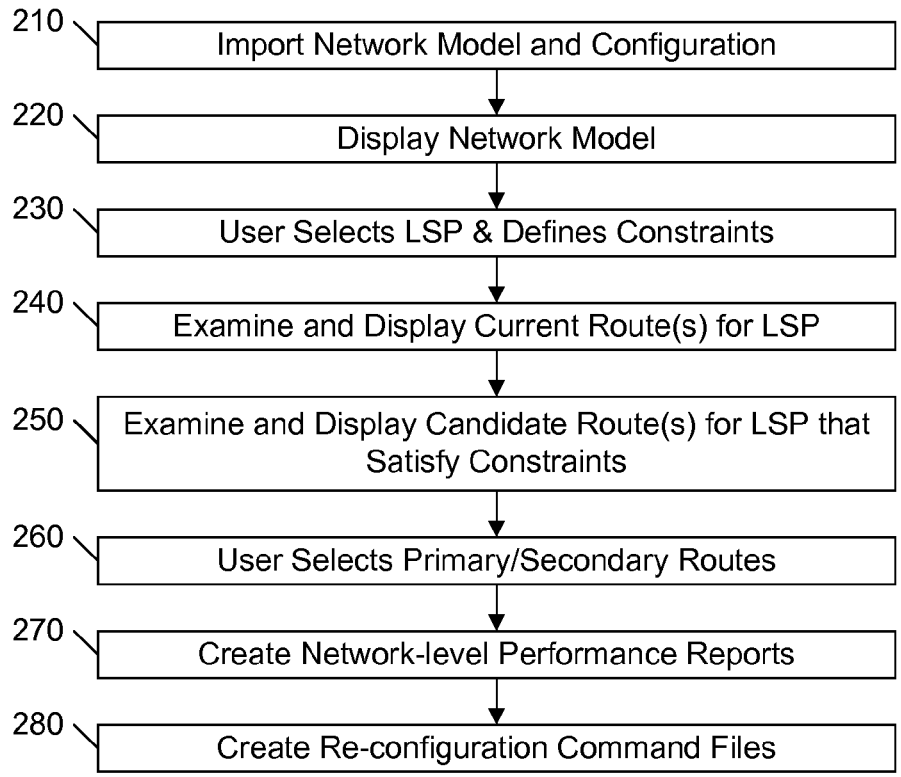
FIG. 2 illustrates an example flow diagram for interactive traffic engineering of targeted routes in accordance with this invention.

FIG. 2 illustrates an example flow diagram for providing interactive traffic engineering of selected paths. At 210, a model of the network and the current configuration of the devices on the network are imported, from which a display of the network is presented, at 220, using conventional tools of the art. Typically, a combined graphic and textual display is presented, such as illustrated in FIGS. 1A-1B.

At 230, the user selects a target path (LSP), and identifies the constraints that this path should satisfy. The constraints may include, for example, a maximum number of hops along the routes of the path, a maximum delay along the route, a maximum link subscription rate or maximum link metric along the route, and so on. Different constraints may be specified for each of the primary and secondary routes for the path, including a constraint that the secondary route use different resources than the primary route, if available. The user is also provided the option of constraining the traffic engineering process to assessing a maximum number of routes, limiting the time consumed searching for candidate routes, and so on. The user can further specify resource class attributes that can be used to implement a variety of policies, e.g., to contain traffic to specific regions of the network.

At 240, the system displays the estimated performance parameters of the current route(s) of the selected path, if any. Typically, the performance parameters include the 'metric' that is associated with the route based on conventional routing techniques, such as the TE Link Metric, the IS-IS Metric, the OSPF Metric, and so on. Additionally, the parameters include the type of route, the maximum link subscription rate, the estimated average delay, the number of hops along the route, the distance along the route, and so on.

The current routes of a path may include a variety of route types. The route that is currently being used by the network, the 'operational' route, is generally included in the set of current routes associated with a path. Routes computed according to a conventional dynamic LSP routing protocol, such as CSPF (Constrained Shortest Path First), may also be included in the set of current routes. In a preferred embodiment, the user is presented the option of running a protocol simulation or flow-analysis application on the current network model, from which the CSPF route(s) for the selected path is determined.

In a preferred embodiment, the system displays the current routes of the selected path in a graphic form, to facilitate the user's visualization of the routes. FIG. 4 illustrates an example display of routes of a selected/target path. In this example illustration, the links of the network that are not included in the current routes of the path are diminished, while the links of the current routes are enhanced. Different line styles are used to indicate the different routes. In this example, the target path is the path from Seattle 401 to Atlanta 402, and two routes are illustrated using a solid and dashed line pattern.

The performance parameters associated with each link on each route are available for display, using bubbles 410, 420, 430. In a preferred embodiment, the performance parameters 410, 420 of the minimum-bandwidth link on each route are displayed by default, while the performance parameters 430 of the other links on the routes are hidden. The user may selectively view the parameters of each link by selecting the collapsed bubble 430 on these links. Parameters and other data associated with each node may also be displayed by selecting the node. Other schemes for displaying and hiding data related to the links or nodes of the routes may also be used.

Returning to the flow of FIG. 2, the system determines the candidate routes for the target path that satisfy the user's constraints, and displays the expected performance parameters associated with each candidate route, at 250. Any of a variety of conventional routing techniques can be used to determine routes between the source and destination nodes, including, for example, running a network simulation or flow analysis to determine CSPF routes, and eliminating those that fail to satisfy the user's constraints. The system may sort the candidate routes by any of the displayed performance parameters according to the user's preference. Generally, the same display options are provided as those provided for displaying the performance parameters of the current routes of the path, as discussed above, including both text and graphic displays. An example text display of candidate routes is illustrated in FIG. 5. In a preferred embodiment, when the user points to a candidate route in the list of FIG. 5, the corresponding route is highlighted in the graphic display of FIG. 4.

The existing/current routes are included in the set of candidate routes, so that the user can decide whether to select an existing route or a newly discovered route as the preferred route for the target path. Typically, the display includes a display of candidates for both the primary and secondary routes, although the candidate secondary routes may change upon selection of a primary route. In a preferred embodiment, the user is provided the option of displaying the details corresponding to selected candidate routes in graphic form, such as the map-view form with information bubbles illustrated in FIG. 4, to facilitate the visualization and selection of a preferred route for each of the primary and secondary routes of the target path. If there are no viable candidate routes, the user is provided the option of relaxing one or more of the specified constraints.

When the user selects a primary route, and a secondary route if desired, the system displays the estimated performance parameters for each, and generates a number of system-level reports based on the selected routes, at 270. In a preferred embodiment, the display includes at least summary and detailed information on the routes that have changed, and summary and detailed information on how the network performance is expected to change based on the routing change.

If the user is satisfied with the estimated performance of the selected routes and the impact, if any, of this selection on the overall network, the user confirms the selection and is provided the option of generating re-configuration command files ("configlets"), at 280. The re-configuration files are preferably structured to allow automation of the re-configuration process, and generally contain the commands strings that are transmitted to the affected routers, typically each of the routers that originate a virtual circuit that has changed. In a preferred embodiment, the user is provided the option of selecting the sets of commands to be exported, as well as the particular format(s) for these command sets, such as IOS, XR, JUNOS, and so on. The user is also provided the option to view and edit the command files before they are used to re-configure the network.

Of particular note, these system-created sets of re-configuration command files serve to automate the recording of the changes made to the network, as contrast to the convention reliance on a manual process for performing and recording each re-configuration action. By providing a traffic engineering tool that can be targeted to specific paths and configured to allow user interaction at each stage, the need for error-prone manual re-configurations and forgetful-prone recording such re-configurations is substantially eliminated.

Figure 3:
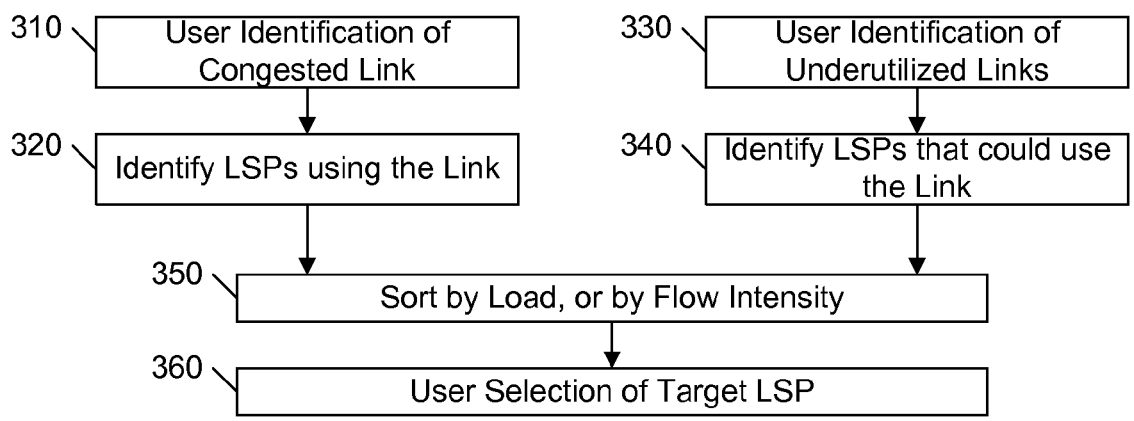
FIG. 3 illustrates an example flow diagram for interactive identification of targeted routes in accordance with this invention.

The specific process of FIG. 2 can be modified as required for addressing varied requirements of the user. FIG. 3 illustrates a pre-process that is preferably provided to assist the user in selecting the target path (230 of FIG. 2). Often, a user may be aware of oversubscription or congestion on a particular link, but is not specifically aware of which path might be re-routed to facilitate an improvement on the link. Or, the user may be aware of an underutilized or undersubscribed link, and is interested in re-routing as-yet-unidentified paths to improve the balance of loads among the links.

As illustrated in FIG. 3, a preferred embodiment of the traffic engineering system of this invention allows a user to identify a congested/overutilized link or an underutilized link, at 310, 330, respectively. At 320, the system identifies the paths that currently use the congested link. At 340, the system identifies the paths that could feasibly use the underutilized link. At 350, the system sorts the identified paths by their load or flow intensity, and presents an ordered list to the user for selection, at 360, of a target LSP for potential re-routing. The process then continues with the user defining the constraints for this target LSP, at 220 of FIG. 2.

In a preferred embodiment, other pre-processing techniques are also provided to facilitate the identification of a target LSP. For example, it may be advantageous to create a virtual circuit for existing routes, such as a route created by an Interior Gateway Protocol. The system preferably identifies existing routes that contribute utilization to a link of interest, such as an overutilized link, and allows the user to create a virtual circuit and select a route for this virtual circuit from among these candidate routes. The selected route is used as the current route in the set of candidate routes for the user's selection. In like manner, the system allows the user to identify a source node and destination node, from which a set of candidate routes can be generated for creating and routing new virtual circuits.

To facilitate awareness of congested or underutilized links, the system provides the option of allowing the user to request an identification of the "top-10" oversubscribed, overutilized, underutilized, or undersubscribed links. Awareness may also be facilitated by using colors or other symbology to display the utilization or subscription of links. Other criteria may also be used for identifying potential target paths, such as an identification of existing routes having the longest delay, node pairs having the highest traffic flow, existing routes that fail to satisfy the defined constraints, and so on.

In a preferred embodiment, the processes of FIGS. 2 and 3 can be interrupted and restarted at will by the user. The user's selections, specified constraints, and so on are represented in a "design action" object and stored in a design action file that can be read by the system to restore the system to any prior point in the traffic engineering process. Additionally, the design action can be used as a baseline for initiating other design actions.

In like manner, selected portions of the design action can be copied to other design actions, to ease the task of creating or completing these other design actions. In a preferred embodiment, 'template' design actions are provided and/or can be created that include, for example, default constraints, or default processes for identifying potential target paths, to further facilitate the creation of customized design actions tailored for a specific network.

FIG. 6 illustrates an example block diagram of a traffic engineering system in accordance with this invention.

In a preferred embodiment, a capture component 620 is configured to collect the current configuration of a network 601, generally by polling each of the routers 610 on the network 601. From this configuration data, the capture component 620 provides an identification of each of the currently defined paths 630 in the network, and the current routes, if any, associated with each of the paths 630. The traffic engineering engine 650 uses the currently defined paths 630 and the model 640 of the network 601 to create a baseline configuration of the network 601.

A user interface 660 allows a user to identify a target path, and to define constraints 670 that are to be satisfied by candidate routes for the target path. One or more routing tools 680 are used to identify the alternative routes 690 that satisfy the constraints 670. One of skill in the art will recognize that the routing tool 680 may be configured to identify the current routes, as well. The traffic engineering engine 650 presents the current routes 630 and the alternative routes 690 as a set of candidate routes for selection by the user via the user interface 660.

The traffic engineering engine 650 also estimates and reports the performance parameters of each candidate route, and allows a user to select a preferred route from the set of candidate routes. The traffic engineering engine 650 also determines the effect that the user's selection of a re-route of the target path will have on the network, and reports such effects to the user via the interface 660. Upon confirmation of the user's selection, the traffic engineering tool also generates re-configuration command files to facilitate the re-configuration of the network 601 to implement the selected route(s).

The foregoing merely illustrates the principles of the invention. It will thus be appreciated that those skilled in the art will be able to devise various arrangements which, although not explicitly described or shown herein, embody the principles of the invention and are thus within its spirit and scope. For example, although this application is presented in the context of creating and modifying MPLS virtual circuits, one of skill in the art will recognize that the principles presented herein are applicable to other technologies, such as GMPLS, ATM, MPLS-Fast-Reroute, optical transport networks, and so on. In like manner, although the process of this invention is presented as a simple sequential process, one of skill in the art will recognize that that the process may be varied. For example, the user may investigate the creation or modification of multiple virtual circuits before assessing their impact on the overall performance of the network and/or before generating the re-configuration command files. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or Software implemented structure or function;

e) each of the disclosed elements may be comprised of hardware portions (e.g., including discrete and integrated electronic circuitry), software portions (e.g., computer programming), and any combination thereof, the software portions being stored on a non-transient computer readable medium;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A traffic engineering system comprising:
a traffic engineering engine,
a routing tool, and
a user interface,
wherein
the traffic engineering engine is configured to receive a set of constraints for a virtual circuit between nodes of a network from a user via the user interface,
the routing tool is configured to determine a plurality of routes for the virtual circuit,
the traffic engineering engine is configured to determine performance parameters associated with each of the plurality of routes, and to present the performance parameters associated with one or more candidate routes that satisfy the set of constraints to the user via the user interface, and
the traffic engineering engine is configured to receive a selection of a preferred candidate route by the user.

2. The system of claim 1, wherein the traffic engineering engine is configured to receive a selection of a secondary candidate route by the user.

3. The system of claim 1, wherein the traffic engineering engine is configured to generate one or more files that include information to facilitate configuring the virtual circuit in the network to use the preferred candidate route.

4. The system of claim 3, wherein the one or more files are configured to facilitate an automated transmission of configuration commands to one or more routers to instantiate the preferred candidate route for the virtual circuit in the network.

5. The system of claim 1, wherein the traffic engineering engine is configured to present performance parameters associated with the network corresponding to each candidate route, to further facilitate the selection of the preferred candidate route by the user.

6. The system of claim 1, wherein the set of constraints include one or more of:
a number-of-hops constraint,
a path-delay constraint,
a subscription-rate constraint,
a link-metric constraint,
a diversity constraint, and
a resource class constraint.

7. The system of claim 1, wherein the traffic engineering engine is configured to determine the performance parameters associated with each candidate route based on a simulation of the network.

8. The system of claim 7, wherein the simulation includes an analysis of traffic-flow in the network.

9. The system of claim 1, wherein the traffic engineering engine is configured to present a visualization of one or more of the candidate routes in a graphic form.

10. The system of claim 9, wherein the graphic form includes a geographic representation of links of the one or more candidate routes.

11. The system of claim 9, wherein the graphic form includes an indication of one or more of the performance parameters associated with at least one of the candidate routes.

12. The system of claim 1, wherein the traffic engineering engine is configured to identify a set of virtual circuits to facilitate selection of the virtual circuit by the user.

13. The system of claim 12, wherein the traffic engineering engine is configured to identify the set of virtual circuits based on a target characteristic of links of the network.

14. The system of claim 13, wherein the target characteristic includes one of link utilization and link subscription rate.

15. The system of claim 12, wherein the traffic engineering engine is configured to identify the set of virtual circuits based on a target characteristic of existing routes of the network.

16. The system of claim 15, wherein the target characteristic includes one of:
 a path delay,
 a traffic flow, and
 whether the existing route satisfies the set of constraints.

17. The system of claim 1, wherein the traffic engineering engine is configured to determine whether existing routes of the virtual circuit satisfy the set of constraints.

18. A method comprising:
 receiving, at a traffic engineering engine, a set of constraints for a virtual circuit between nodes of a network from a user,
 determining, by a routing tool, a plurality of routes for the virtual circuit,
 determining, by the traffic engineering engine, performance parameters associated with each of the plurality of routes,
 presenting, by the traffic engineering engine, the performance parameters associated with one or more candidate routes that satisfy the set of constraints to the user, and
 receiving, by the traffic engineering engine, a selection of a preferred candidate route by the user.

19. The method of claim 18, including receiving a selection of a secondary candidate route by the user.

20. The method of claim 18, including generating one or more files that include information to facilitate configuring the virtual circuit in the network to use the preferred candidate route.

21. The method of claim 20, including transmitting configuration commands based on the information in the one or more files to one or more routers, to instantiate the preferred candidate route for the virtual circuit in the network.

22. The method of claim 18, including presenting performance parameters associated with the network corresponding to each candidate route, to further facilitate the selection of the preferred candidate route by the user.

23. The method of claim 18, wherein the set of constraints include one or more of:
 a number-of-hops constraint,
 a path-delay constraint,
 a subscription-rate constraint,
 a link-metric constraint,
 a diversity constraint, and
 a resource class constraint.

24. The method of claim 18, including simulating the network to determine the performance parameters associated with each candidate route.

25. The method of claim 18, including analyzing traffic-flow in the network to determine the performance parameters associated with each candidate route.

26. The method of claim 18, including presenting a visualization of one or more of the candidate routes in a graphic form.

27. The method of claim 26, wherein the graphic form includes a geographic representation of links of the one or more candidate routes.

28. The method of claim 26, wherein the graphic form includes an indication of one or more of the performance parameters associated with at least one of the candidate routes.

29. The method of claim 18, including identifying a set of virtual circuits to facilitate selection of the virtual circuit by the user.

30. The method of claim 29, including identifying the set of virtual circuits based on a target characteristic of links of the network.

31. The method of claim 30, wherein the target characteristic includes one of link utilization and link subscription rate.

32. The method of claim 18, including identifying a set of virtual circuits to facilitate selection of the virtual circuit by the user based on a target characteristic of existing routes of the network.

33. The method of claim 32, wherein the target characteristic includes one of:
 a path delay,
 a traffic flow, and
 whether the existing route satisfies the set of constraints.

34. The method of claim 18, including determining whether existing routes of the virtual circuit satisfy the set of constraints.

35. A non-transient computer readable medium that includes a computer program that causes a processor to:
 receive a set of constraints for a virtual circuit between nodes of a network from a user,
 determine a plurality of routes for the virtual circuit,
 determine performance parameters associated with each of the plurality of routes,
 present the performance parameters associated with one or more candidate routes that satisfy the set of constraints to the user, and
 receive a selection of a preferred candidate route by the user.

36. The medium of claim 35, wherein the computer program causes the processor to generate one or more files that include information to facilitate configuring the virtual circuit in the network to use the preferred candidate route.

37. The medium of claim 35, wherein the computer program causes the processor to simulate the network to determine the performance parameters associated with each candidate route.

38. The medium of claim 35, wherein the computer program causes the processor to analyze traffic-flow in the network to determine the performance parameters associated with each candidate route.

39. The medium of claim 35, wherein the computer program causes the processor to present a visualization of one or more of the candidate routes in a graphic form.

* * * * *